Jan. 6, 1953     C. L. HORNBERGER     2,624,440
DEVICE FOR CONTROLLING MOVEMENT OF A MEMBER ON A CONVEYER
Filed June 9, 1951     3 Sheets-Sheet 1
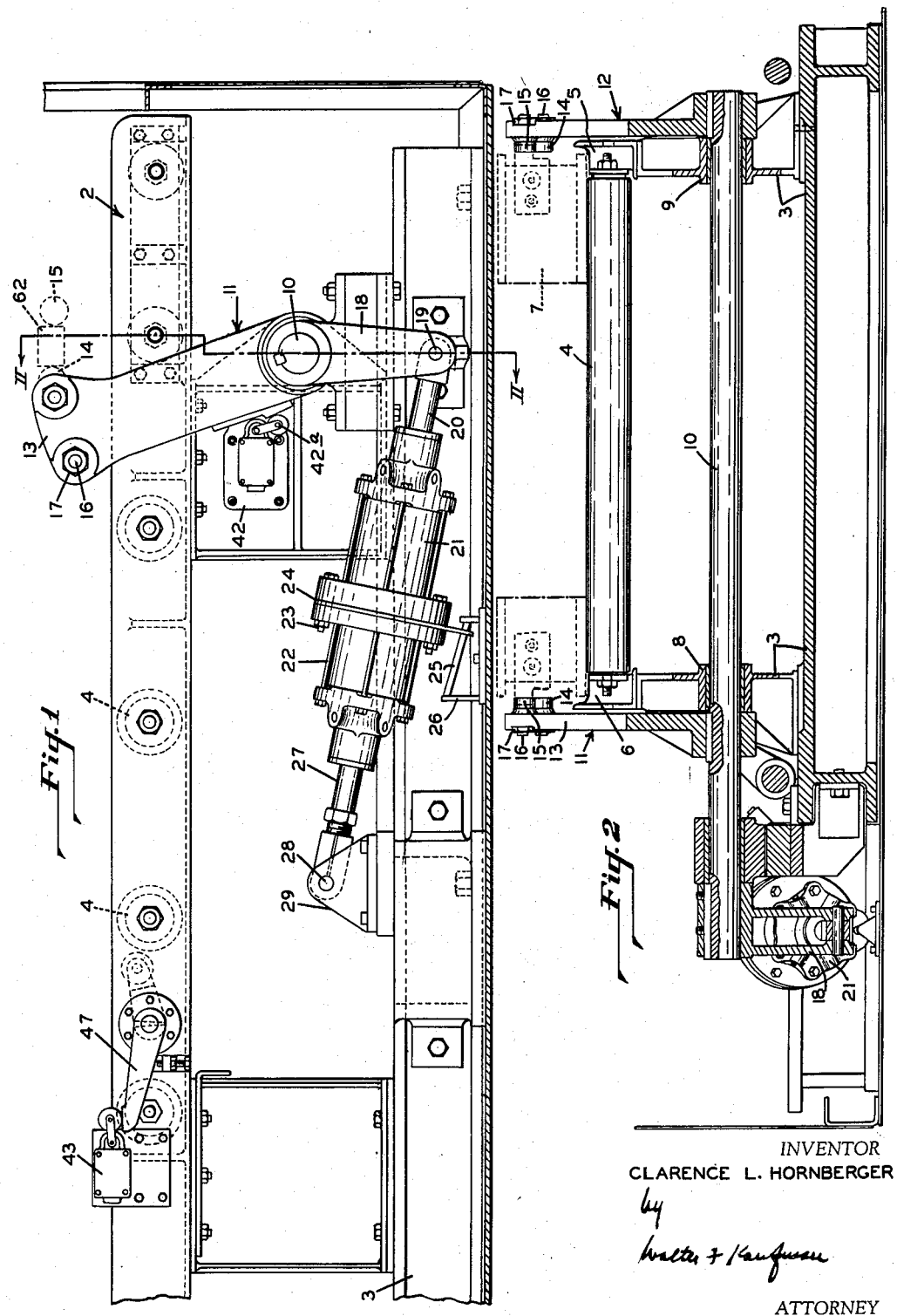
INVENTOR
CLARENCE L. HORNBERGER
by
ATTORNEY Jan. 6, 1953 C. L. HORNBERGER 2,624,440
DEVICE FOR CONTROLLING MOVEMENT OF A MEMBER ON A CONVEYER
Filed June 9, 1951 3 Sheets-Sheet 2

INVENTOR
CLARENCE L. HORNBERGER

ATTORNEY

Jan. 6, 1953      C. L. HORNBERGER      2,624,440

DEVICE FOR CONTROLLING MOVEMENT OF A MEMBER ON A CONVEYER

Filed June 9, 1951      3 Sheets-Sheet 3

INVENTOR
CLARENCE L. HORNBERGER

ATTORNEY

Patented Jan. 6, 1953

2,624,440

UNITED STATES PATENT OFFICE 2,624,440

DEVICE FOR CONTROLLING MOVEMENT OF A MEMBER ON A CONVEYER

Clarence L. Hornberger, Manheim Township, Lancaster County, Pa., assignor to Armstrong Cork Company, Lancaster, Pa., a corporation of Pennsylvania Application June 9, 1951, Serial No. 230,731

8 Claims. (Cl. 198—19)

This invention relates to a device for controlling the movement of a member such as a mold traveling on a roller conveyor to arrest the free movement of the mold, to bring it to a fixed position of rest, and subsequently to impart motion to the mold to move it along the conveyor.

The invention will be applicable to controlling the movement of members of various sorts in many different manufacturing operations, such as filled crates or packing cases which are to be brought to a position of rest where the covers are to be secured by nailing or banding, and the crate or case moved to a carloading or storage station. Also, it will be applicable in foundry operations for controlling movement of heavy flasks from filling, tamping, and other operating stations. The device will be of general utility; but for purposes of illustration, reference will be made to a mold controlling unit useful with molds used in the manufacture of cork composition.

In the fabrication of cork composition utilizing dielectric heating to cure the binder, the cork granules coated with a binder are charged into a mold at a loading station. The mass in the mold is compressed by means of a hydraulic press located at the loading station, the mass being held under applied compression by end plates locked to the mold walls. The charged mold is then moved from the loading station and delivered along a roller conveyor to a heating station where the mass is subjected to a field of force from a high-frequency alternating electric current generator to heat the mass to a desired temperature for binder activation. After completion of the heating step, the mold is delivered to a conveyor which carries the mold over a path of travel back to the loading station where the completed body of cork composition is extracted from the mold and a fresh charge of binder-coated cork granules is deposited in the mold and the operation is repeated.

The molds are relatively large, weighing about 3,000 pounds loaded, and a substantial restraining force is required to arrest their movement as they enter the various operating stations, the molds having gained considerable momentum in the course of their travel along a roller conveyor from one operating station to the next one. When in an operating station, it is essential generally to accurately position the mold for the performance of fabricating operations. For instance, in the loading station, the mold must be accurately positioned to permit a filling boot to fit down into the mold to direct the cork granules therein. Also, accuracy of positioning is necessary to permit the compressing ram of the press to pass within the mold opening to compress the charge therein. In the heating station accurate positioning is necessary to permit automatic connection of the heating elements to the mold.

Movement of the mold from the "at-rest" position in the various operating stations requires considerable force to impart sufficient momentum to the molds so that they will travel along the roller conveyor sections to the next operating station.

An object of the present invention is to provide a control device which will arrest free movement of a member, bring it to an "at-rest" position, and then impart movement to it from the "at-rest" position.

Another object of the invention is to provide a control device in which movement of a member from an "at-rest" position is initiated by movement of an oncoming member to be received and disposed in said "at-rest" position.

Other objects of the invention will become apparent from consideration of the detailed description which follows.

According to this invention, there is provided a pivoted control mechanism engageable with the member to be controlled, means connected to the pivoted control mechanism for arresting the free pivotal movement of said control mechanism for a portion of its rotation in one direction toward an "at-rest" position, and means for imparting pivotal motion to said control mechanism to bring it to said "at-rest" position, to move it to a mold-delivery position, and to return it to a mold-receiving position.

In order that the invention may be readily understood, an embodiment thereof will be described in conjunction with the attached drawings, in which:

Figure 1 is a side elevational view, partially in section, illustrating the invention;

Figure 2 is a sectional view taken along the line II—II of Figure 1;

Figure 3:
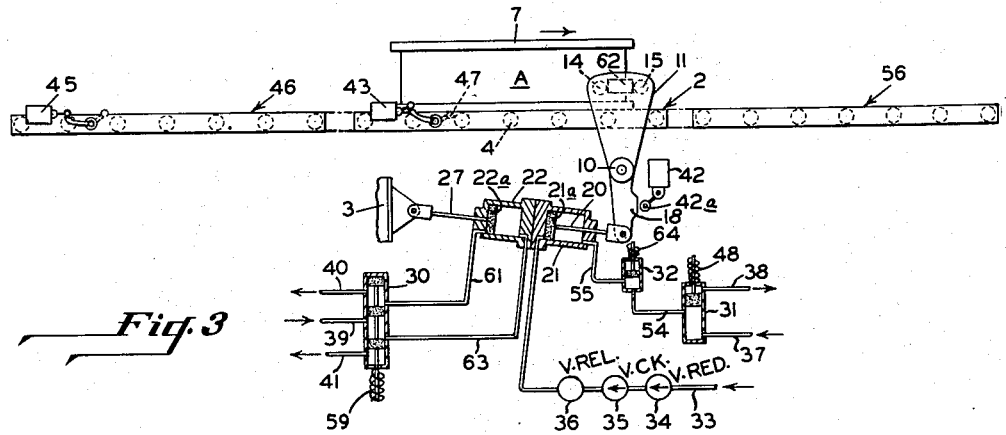
Figure 4:
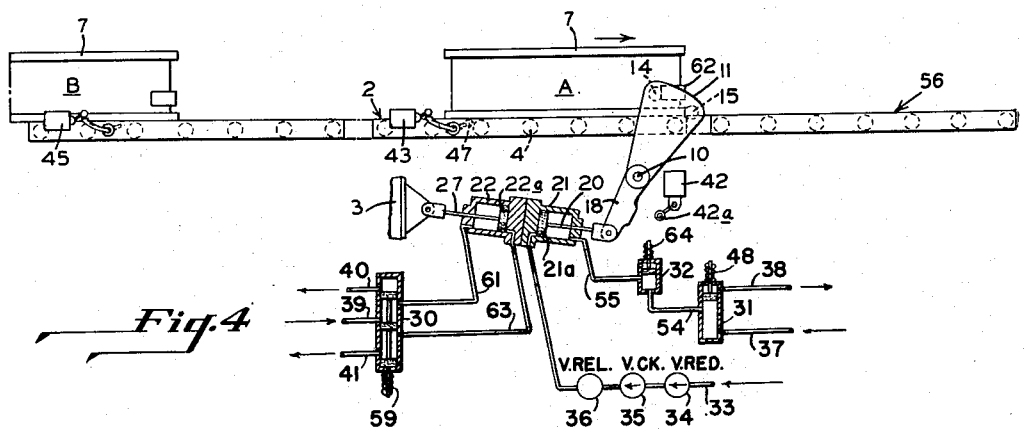
Figure 5:
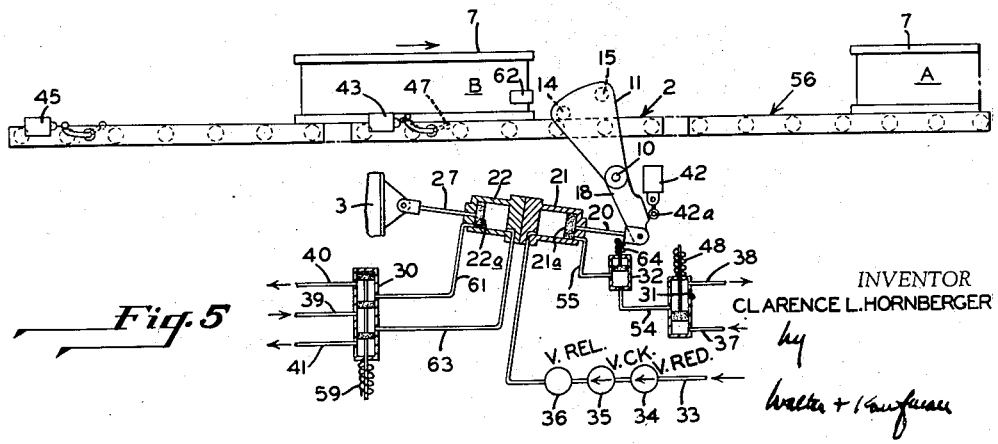
Figure 6:
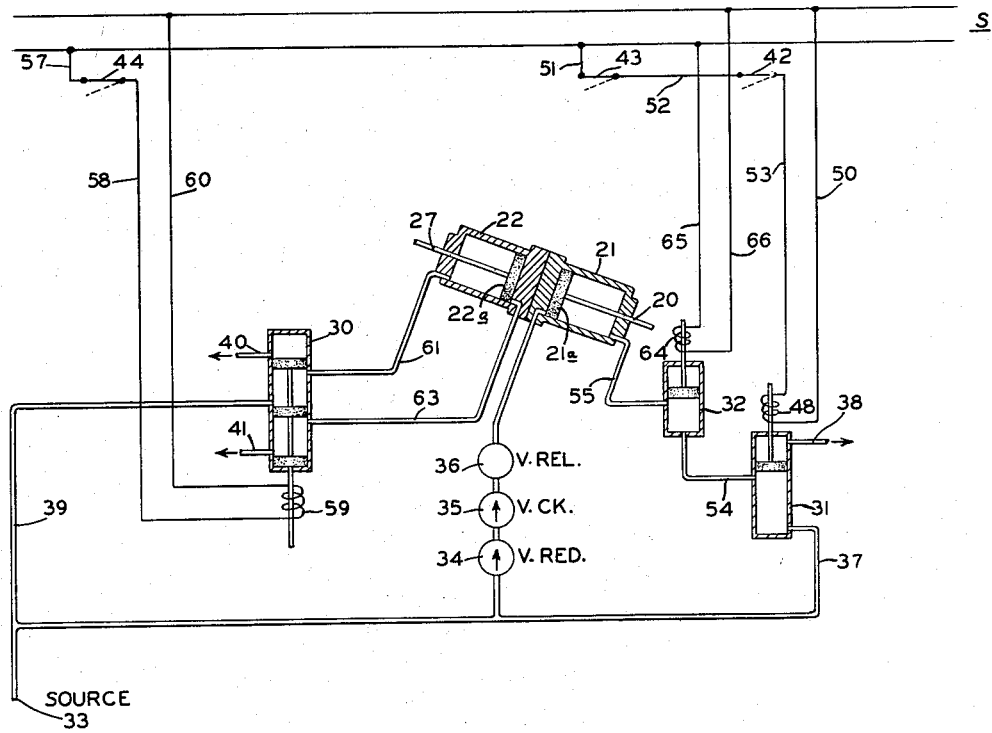

Figures 3, 4, and 5 are diagrammatic views showing the positions assumed by the mechanism during its operation; and Figure 6 is a diagrammatic view showing the valving and valve control arrangement.

Referring to Figure 1 there is shown a conveyor section 2 which is mounted upon a framework 3. The conveyor includes a plurality of rolls 4 which are mounted in side frame members 5 and 6. The rolls 4 are journaled in bearings and are freely rotatable.

A mold 7 is shown in Figures 3, 4, and 5 positioned upon the rolls 4. Mounted on the frame 3 in bearings 8 and 9 is a cross shaft 10. Keyed to the cross shaft 10 are a pair of control arms 11 and 12. Each arm includes a portion 13 shown in Figure 1 which is provided with a pair of projecting buttons 14 and 15 secured to the arms 11 and 12 by threaded studs 16 which are integral therewith. Nuts 17 secure the buttons in position. An actuating arm 18 also is keyed to cross shaft 10 which carries the control arms 11 and 12. Actuating arm 18 has pivoted thereto at 19 a piston rod 20 which operates within a cylinder 21. A second cylinder 22 is secured to cylinder 21, the two being bolted together by bolts 23 as shown in Figure 1 with an intermediate plate 24 disposed therebetween. The plate 24 serves as a guiding plate, the same being received over a guiding rod 25 fixed to the machine frame in suitable supporting standards 26. A piston rod 27 operates within the cylinder 22 and is pivoted at 28 to a bracket 29 secured to the frame of the machine. Actuation of the pistons within the cylinders 21 and 22 is effective for controlling the motion of the arms 11 and 12 in the manner hereinafter described.

Referring now to Figures 3, 4 and 5, the mold 7 is shown in an "at-rest" position in Figure 3 and in delivery and entering positions in Figures 4 and 5, respectively.

With the mold 7 in the position shown in Figure 3, the piston in cylinder 21 will be in its retracted position; whereas, the piston in cylinder 22 will be in its extended position. This is effected through the valve arrangement and electrical control shown in Figure 6. There are a four-way valve 30 and a three-way valve 31 which control the operation of the pistons in cylinders 21 and 22. A safety valve 32 is provided in series with the three-way valve 31. The valves 30 and 31 control the supply of actuating air to the cylinders 21 and 22, and the actuating arm 18 which is connected by cross shaft 10 to the control arms 11 and 12 is controlled by relative movement between the cylinders and their pistons.

A cushioning or arresting action is effected upon the mold 7 through the arms 11 and 12. This is accomplished by continuously supplying the cylinder 21 with a compressible fluid under pressure, such as air at about four pounds per square inch. This may be obtained by supplying air from a source 33 at 60 pounds per square inch pressure and delivering it through a pressure control valve 34 set at four pounds per square inch, a one-way check valve 35, and a pressure relief valve 36. The pressure relief valve may be set to operate at about 28 pounds per square inch, for example. The check valve 35 permits the air to enter in front of the piston 21a of cylinder 21 but prevents the escape of air from the system, except through the pressure relief valve 36. The control of actuating air for moving the piston 21a in cylinder 21 from its extended to the retracted position shown in Figure 3 is effected through the three-way valve 31, air being supplied thereto through line 37 connected to the source 33 and air being exhausted through line 38. Valve 31 is electrically controlled as diagrammatically shown in Figure 6, the same being of the solenoid type.

The supply of air for actuation of the piston 22a in cylinder 22 is controlled through solenoid valve 30. Air is supplied through line 39 connected to source 33, and exhausting is effected through lines 40 and 41.

Control of the solenoid valve 31 is obtained through a pair of switches 42 and 43 which are electrically connected in series as shown in Figure 6. Switch 42 is normally spring urged to a closed position, and switch 43 is normally spring urged to an open position.

Solenoid valve 30 may be controlled manually by a switch 44 shown in Figure 6 or may be automatically controlled by switch 45 positioned on a section 46 of roller conveyor in advance of the section 2. For purposes of illustration of the control system reference will be made to the manual control switch 44.

Reference is now made to Figure 6 and to Figure 3 which shows the mold 7 in the "at-rest" position. Switch 42 which, as mentioned above, is normally closed, and switch 43, which is normally open but has been closed by contact of the mold 7 with a pivoted actuating arm 47, complete the circuit for the supply of current to the solenoid portion 48 of the valve 31 from source of supply of electrical current S through leads 50, 51, 52, and 53, all as shown in Figure 6. In this figure, the switches 42 and 43 are shown in closed positions, their open positions having been indicated by dotted lines. When solenoid 48 is energized, valve 31 is opened as shown in Figure 3, and air under pressure flows from the supply source 33 through line 37 and valve 31, through a line 54, through valve 32, which is normally open, and a line 55 to cylinder 21, applying air pressure to the back of the piston 21a and holding it against movement from its retracted position as shown.

Now assuming that the operation on mold 7 in the station shown in Figure 3 has been completed, and it is desired to move the mold out of the station, this is effected through actuation of the arms 11 and 12 through rotation of the shaft 10 controlled by the actuating arm 18 in the following manner: Switch 44 is manually controlled and the same is closed for a limited period of time, adequate to permit movement of the mold 7 from the conveyor section 2 onto conveyor section 56, for example. If the movement of mold 7 from the "at-rest" position of Figure 3 is automatically controlled by switch 45 positioned on conveyor section 46, an advancing mold 7 shown in Figure 4 will move over the control arm of switch 45, moving the same from its normally open to a closed position. This switch will function in the same manner as switch 44. Switch 44 (or the equivalent switch 45) controls the supply of current from source S through leads 57 and 58 to the solenoid section 59 of the valve 30, the other side of the line from the source being connected to the solenoid section 59 through a lead 60. When the solenoid section 59 is energized, the valve 30 will assume the position shown in Figure 4 and air under 60 pounds per square inch pressure will be supplied from the source 33 through line 39 to the valve 30 and will flow through a flexible line 61 into the cylinder 22. All the supply lines connected to cylinders 21 and 22 must be flexible, for the cylinders move along guide rod 25 as previously mentioned. Since the piston rod 27 is fixed to the machine frame and the cylinder is free to move along the guide rod 25 (Figure 1), the application of air to the cylinder 22 through line 61 will cause the cylinders 21 and 22 which are connected to move in unison upwardly along the guide rod 25. This will effect a clockwise motion to the actuator arm 18 imparting a concomitant motion to the cross shaft 10 and the control arms 11 and 12, air under pressure supplied to the cylinder 21 through line 55 preventing relative movement between the cylinder 21 and its piston 21a. This motion of arms 11 and 12 brings the buttons 14 on the arms into engagement with the back side of lugs 62 secured to the mold 7 and positioned to lie between buttons 14 and 15 in the "at-rest" position but to be engaged by the buttons 14 when the arms 11 and 12 are moved from that position to a mold delivery position as shown in Figure 4; and to engage buttons 15 when moving toward the "at-rest" position as shown in Figure 5. Movement of the control arms from the Figure 3 to the Figure 4 position imparts momentum to the mold 7, and it rolls along the conveyor sections 2 and 56 to the next operating station. It will be noted by reference to Figure 4 that the lugs 62 fully clear the buttons 15 as rotation is imparted to the arms 11 and 12, the arm 11 being shown in Figure 4. As the cylinders 21 and 22 are moved, the air disposed in advance of the piston 22a in cylinder 22 is exhausted to the atmosphere through line 63, the valve 30, and line 41.

As the mold 7 moves from the conveyor section 2 onto the conveyor section 56, switch 43 returns to its normally open position, contact control arm 47 having been disengaged by the mold 7. When this occurs, the circuit for the supply of energizing current for the solenoid section 48 of valve 31 is interrupted and the valve 31 moves to its closed position shown in Figure 5. Thereupon, the piston in cylinder 21 is moved to its extended position by air flowing from the source of supply 33 through control valve 34, check valve 35, and relief valve 36. When the piston 21a in cylinder 21 is moved in this manner, air is exhausted through line 55, safety valve 32, and line 54 to valve 31, and thence through exhaust line 38 therein. Movement of the piston rod 20 of the piston 21a in cylinder 21, which rod is pivoted to the actuating arm 18 keyed to the cross shaft 10, causes the arms 11 and 12 to travel to a position approaching that at which the buttons 15 on the arms 11 and 12 will lie within the path of travel of the lugs 62 on the mold 7.

Final motion to the position shown in Figure 5 is accomplished through control valve 30 in the following manner: upon manual release of switch 44 or upon disengagement of an oncoming mold from the control arm of switch 45, the circuit for the supply of current for the solenoid section 59 of the control valve 30 is interrupted and the valve moves to the position shown in Figure 5. In this position, air from the source of supply 33 passes through line 39 and valve 30, through a line 63 to the cylinder 22, applying air pressure to the head of the piston therein, and moving the cylinders 21 and 22 to the right as viewed in Figures 3, 4, and 5 to the final position shown in Figure 5 with the arms 11 and 12 in mold-receiving position. It should be remembered that piston rod 27 is secured to the machine frame, and application of air pressure to the piston 22a is thus effective for moving the cylinders. When the actuating arm 18 moves to the position shown in Figure 5 it engages the control roller 42a of the switch moving the same from its normally closed to an open position.

When the mold 7 moves into engagement with the buttons 15 on the arms 11 and 12 it tends to rock the arms about their pivots, turning the cross shaft 10. As mentioned above, the actuating arm 18 is also keyed to the cross shaft 10 and any motion of the arms 11 and 12 imparts a motion of rotation in the same direction to the actuating arm 18. Such motion is cushioned by movement of the piston 21a within cylinder 21, for the piston rod 20 is pivoted to the arm 18 as shown in Figure 1. As previously mentioned, air under low pressure is continuously supplied to the cylinder 21, having been reduced by valve 34 to about 4 pounds per square inch. As the piston 21a moves in the cylinder 21 from the position shown in Figure 5 to the position of Figure 3, air in cylinder 21 is compressed until a value of about 28 pounds per square inch is attained, whereupon relief valve 36 opens, venting the air to the atmosphere and maintaining a cushioning force of about 28 pounds per square inch on the piston in cylinder 21. This acts as a shock absorber or cushioning device which arrests the forward movement of the mold. As mentioned above, the loaded mold may weigh in excess of 3,000 pounds, and substantial forces are created in its forward motion which must be arrested abruptly and without excessive shock.

As the arm 18 is moved by forward motion of mold 7 against control arms 11 and 12 and the speed of motion is arrested, contact roller 42a of switch 42 moves to its normally closed position, solenoid 48 of valve 31 is energized, and at the same time, mold 7 has engaged control arm 47 of switch 43 moving the same from its normally open to a closed position. When this occurs, air from source 33 flows through line 37, through valve 31, line 54, valve 32 and line 55 to the rear of the piston 21a in cylinder 21 causing the same to move to the position shown in Figure 3 to bring the mold 7 to a final "at-rest" position. Since the air applied to the rear of piston 21a is at 60 pounds per square inch, it will overcome the back pressure of about 28 pounds per square inch applied against the face of the piston 21a and controlled by pressure relief valve 36; thus, the final motion of the mold to its "at-rest" position will be restrained, facilitating accurate positioning.

Valve 32 has its solenoid control 64 directly connected to the source of current S through leads 65 and 66. This valve is normally closed but is held open upon energization of solenoid 64. Thus, upon failure of current supply from source S, valve 32 will close, interrupting the movement of air from cylinder 21 through line 55 thus insuring that the arms 11 and 12 will remain in an "at-rest" position.

The mechanism is effective for reducing the speed of forward motion of the mold as it approaches an "at-rest" position in an operating station. It then positively moves the mold to its "at-rest" position. Then either manually or automatically upon the approach of another mold, it moves the mold in the "at-rest" position to a discharge position, imparting sufficient momentum to the mold to cause it to move to the next station. Upon movement of the mold from the "at-rest" position to the discharge position, the control mechanism reverses its position to a mold-receiving position where it will be engaged by the oncoming mold to cushion its movement toward the "at-rest" position.

I claim:

1. In a device for controlling the movement of a member along a path of travel to arrest the forward motion thereof and bring the member to a predetermined "at-rest" position in said path of travel, a control arm pivoted for movement, means on the control arm engageable with the member to be controlled, a fluid pressure cylinder having a piston movable therein, a piston rod pivotally connecting said piston to said control arm, means for maintaining a back pressure against said piston to limit free movement thereof in one direction and arrest motion of said member along said path of travel, and means for controlling the application of pressure against said piston to overcome said back pressure and move said piston in said one direction to a predetermined position to bring said member to an "at-rest" position.

2. In a device for controlling the movement of a member along a path of travel to arrest the forward motion thereof, bring the member to a predetermined "at-rest" position in said path of travel, and impart momentum to said member from said "at-rest" position to move the same along said path of travel, a control arm pivoted for movement, means on the control arm engageable with the member to be controlled, means restraining free movement of the control arm for a portion of its movement to arrest motion of said member along said path of travel, means for moving said control arm to a predetermined position to bring said member to an "at-rest" position, and means for advancing said control arm from said predetermined position to impart momentum to said member.

3. In a device for controlling the movement of a member along a path of travel to arrest the forward motion thereof, bring the member to a predetermined "at-rest" position in said path of travel, and impart momentum to said member from said "at-rest" position to move the same along said path of travel, a control arm pivoted for movement, means on the control arm engageable with the member to be controlled, a pair of fluid pressure cylinders mounted together for movement in unison, a first piston in one of said cylinders pivotally connected to said control arm, a second piston in the other of said cylinders fixed for movement of said other cylinder with respect thereto, means for limiting the free movement of said first piston in one direction in its cylinder to cushion the movement of said control arm and arrest the motion of said member along said path of travel, means for applying fluid under pressure to said first piston to move the same in said one direction to bring said control arm to a predetermined "at-rest" position, and means for applying fluid under pressure to said second piston to move said cylinders and said first piston to pivot said control arm from said "at-rest" position and impart momentum to said member to move the same along said path of travel.

4. In a device for controlling the movement of a member along a path of travel, a control arm pivoted for movement, a pair of mechanical contacts on said arm and engageable with the member to be controlled, means for positioning one of said contacts in said path of travel of said member to be controlled, means for cushioning the motion of said control arm upon engagement of said member with said one of said contacts and pivotal motion of said control arm, said cushioned movement of said arm bringing the second of said contacts into position for engagement with said member, and means for moving said control arm to bring second of said contacts into engagement with said member and said first of said contacts out of engagement with said member to deliver said member along said path of travel.

5. In a device for controlling the movement of a member along a path of travel, a frame, a pair of control arms, a pivot shaft to which said arms are connected for pivotal motion in unison, means on said arms engageable with the member to be controlled, an actuator arm connected to said pivot shaft, two fluid pressure cylinders mounted for movement in unison, a first piston in one of said cylinders pivoted to said actuator arm, a second piston in the other of said cylinders pivoted to the frame for movement of said cylinders with respect thereto, means for maintaining a back pressure of compressible fluid on said first piston to normally move the same to extended position to pivot said control arm to a member-receiving position and for cushioning movement of said control arm in an opposite direction, means responsive to the position of said control arm for controlling the supply of fluid under pressure to said first piston to move the same to a retracted position against said back pressure to pivot said control arm to a fixed "at-rest" position, and means for applying fluid under pressure to said second piston to move said cylinders and said first piston to pivot said control arm and impart momentum to said member to move the same along said path of travel.

6. In a device for controlling the movement of a member along a path of travel to arrest the forward motion thereof and bring the member to a predetermined "at-rest" position in said path of travel, a control arm pivoted for movement, means on the control arm engageable with the member to be controlled, a fluid pressure cylinder having a piston movable therein, means connecting said piston to said control arm, means for maintaining a predetermined back pressure against said piston to restrict free movement thereof in one direction and arrest motion of said member along said path of travel, and means controlled by movement of said arm for applying pressure against said piston to overcome said back pressure and move said piston in said one direction to a predetermined position to bring said member to an "at-rest" position.

7. In a device for controlling the movement of a member along a path of travel to arrest the forward motion thereof, bring the member to a predetermined "at-rest" position in said path of travel, and impart momentum to said member from said "at-rest" position to move the same along said path of travel, a control arm pivoted for movement, means on the control arm engageable with the member to be controlled, means restraining free movement of the control arm for a portion of its movement to arrest motion of said member to be controlled along said path of travel, means for moving said control arm to a predetermined position to bring said member to be controlled to an "at-rest" position, and means controlled by an oncoming member for advancing said control arm from said predetermined position to impart momentum to said member to be controlled.

8. In a device for controlling the movement of a member along a path of travel to arrest the forward motion thereof and bring the member to a predetermined "at-rest" position in said path of travel, a control arm pivoted for movement from a member-receiving position to an "at-rest" position, means on the control arm engageable with the member to be controlled and lying in said path of travel with said arm in member-receiving position, an air cylinder having a piston movable therein connected to said control arm, said piston lying in extended position to hold said arm in mold-receiving position, means for maintaining a predetermined back pressure against said piston to restrict free movement thereof from said extended position to a retracted position to cushion movement of said control arm upon engagement by said member to be controlled, means controlled by movement of said arm from mold-receiving position effected by said member moving along said path of travel for applying fluid pressure against said piston to overcome said back pressure and move said piston to a predetermined retracted position to bring said member to an "at-rest" position, and means controlled by movement of said member from said "at-rest" position out of the control of said control arm for discontinuing the application of said overcoming pressure to hold said piston in retracted position, said back pressure moving said piston to extended position to pivot said arm to mold-receiving position.

CLARENCE L. HORNBERGER.

REFERENCES CITED

The following references are of record in the file of this patent:

UNITED STATES PATENTS

| Number | Name | Date |
| --- | --- | --- |
| 2,156,695 | Klein | May 2, 1939 |
| 2,347,346 | Wright | Apr. 25, 1944 |
| 2,470,415 | Seborg | May 17, 1949 |
| 2,490,765 | Abbott | Dec. 13, 1949 |
| 2,562,035 | Hileman | July 24, 1951 |